United States Patent [19]

Cha

[11] 4,095,232

[45] June 13, 1978

[54] APPARATUS FOR PRODUCING MULTIPLE UNIFORM FLUID FILAMENTS AND DROPS

[75] Inventor: Charles L. Cha, Xenia, Ohio

[73] Assignee: The Mead Corporation, Dayton, Ohio

[21] Appl. No.: 816,607

[22] Filed: Jul. 18, 1977

[51] Int. Cl.² .................................... G01D 15/18
[52] U.S. Cl. ......................................... 346/75
[58] Field of Search ................................ 346/75

[56] References Cited

U.S. PATENT DOCUMENTS

| | | | |
|---|---|---|---|
| 3,900,162 | 8/1975 | Titus et al. | 346/75 X |
| 4,010,477 | 3/1977 | Fray | 346/75 |

Primary Examiner—George H. Miller, Jr.
Attorney, Agent, or Firm—Biebel, French & Nauman

[57] ABSTRACT

Method and apparatus for use in an ink jet printing device to synchronously produce a plurality of uniform fluid filaments and droplets. A fluid reservoir is provided with an orifice plate having a plurality of orifices through which the fluid issues to produce the desired filaments and droplets. The top of the reservoir consists of a flexible pressure plate which can be flexed in a transverse bending motion by a plurality of electroacoustic transducers suspended above the pressure plate so as to produce substantially uniform pressure waves in the fluid over the plurality of orifices.

8 Claims, 5 Drawing Figures

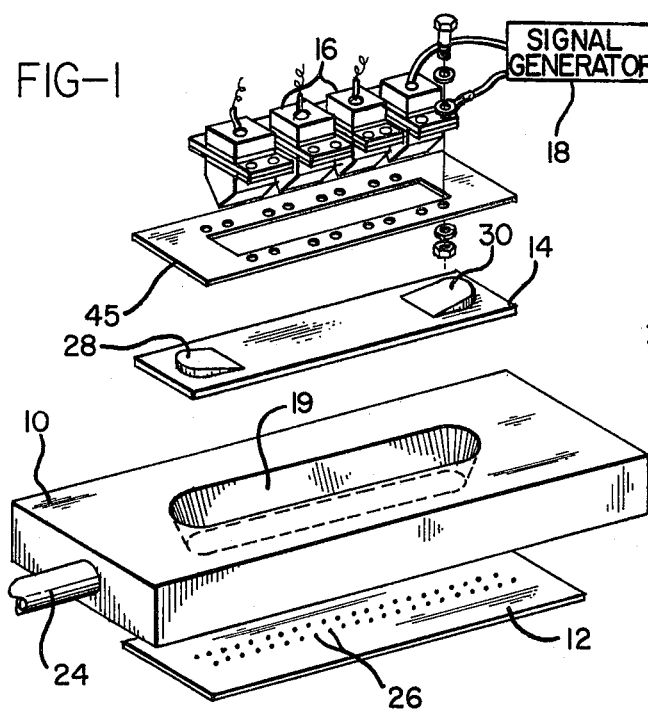
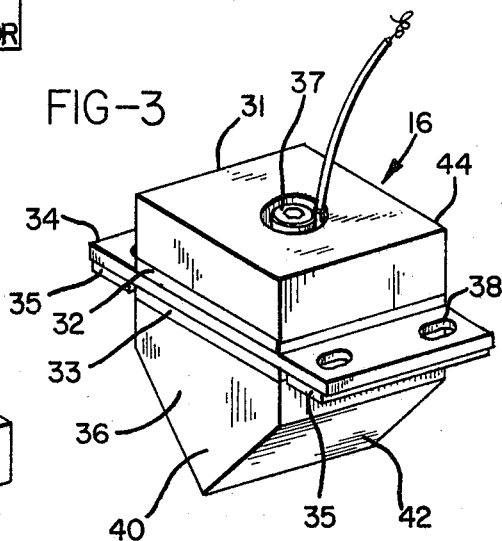
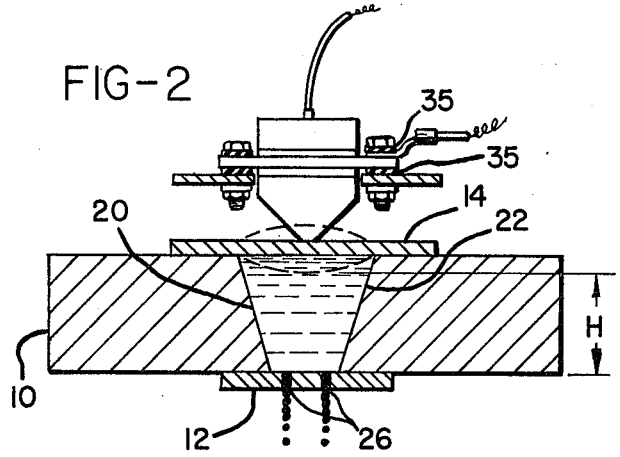
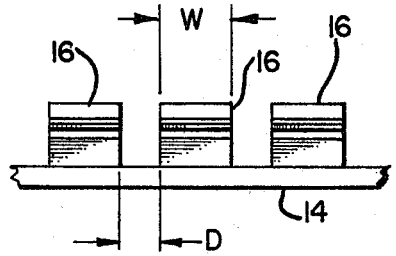
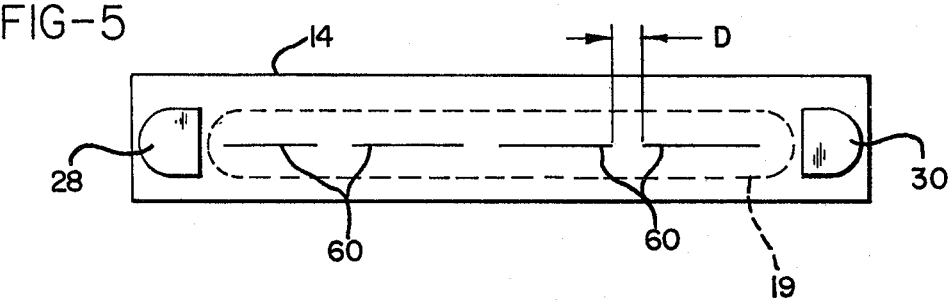

APPARATUS FOR PRODUCING MULTIPLE UNIFORM FLUID FILAMENTS AND DROPS

BACKGROUND OF THE INVENTION

1. Field of the Invention

The present invention relates to fluid droplet generation, and more particularly, to the generation of a matrix of uniform fluid droplets from a linear array of fluid jets for use in printing apparatus such as ink jet printing devices and the like.

2. Prior Art

Uniform fluid filaments and synchronous droplet generation is particularly useful in multiple ink jet printing apparatus of the type disclosed, for example, in Lyon U.S. Pat. No. 3,739,393, although the present invention is a different approach of the actual drop stimulation portion of this device. Generally, in such devices there are one or more rows of orifices which receive an electrically conductive recording fluid, such as for instance a water base ink, from a pressurized fluid supply reservoir and eject the fluid in rows of parallel streams or filaments which are stimulated to produce uniform size droplets.

As the droplets are formed they are selectively charged by application of charging voltages to charging electrodes positioned adjacent the filaments at the point where they break up into drops. Droplets which are so charged are deflected by an electrical field into an appropriately positioned catcher. Drops which are not so charged pass through the electrical field without being deflected and are deposited on a web which is transported at relatively high speed across the droplet paths. In addition to achieving maximum printing quality it is important to achieve maximum printing width. In order to achieve the latter, it is essential that there is minimum energy fluctuation throughout the jet array. This energy uniformity is reflected as filament length uniformity within the array. Excessive energy fluctuation (filament length variation) will cause either the generation of satellite droplets or nonlinear behavior of the jet, both of which are unacceptable conditions for printing.

Printing information is transferred to the droplets through charging. In order to print at the highest possible resolution, charging voltages should be applied to the charging electrodes at the same frequency as that at which the drops are being generated. This permits each depositing drop to define a resolution cell distinct from that of all other drops. In addition, printing information cannot be transferred to the drops properly, unless each charging electrode is activated in phase with drop formation at the associated filament. Failure to do this results in partially charged drops, which miss the catcher and deposit at erratic positions on the web.

It is therefore apparent that jet drop printers of the above described type cannot be operated at their maximum capability unless the drops in all stream are generated in synchronism with their associated data transfer charging pulses. This in turn implies either a measurement of drop generation timing for each and every filament or control of drop generation in such a way that the timing or phase of drop generation is predetermined.

The ideal solution from a simplicity point of view is to apply drop stimulating disturbances to all filaments at a common amplitude and in exact synchronism. Then if the jets all have the same diameter, velocity and rheological characteristics, all filaments will have the same length and will generate drops in synchronism. Such synchronized drop generation greatly facilitates the desired data phase locking, because a timing measurement for one jet is a timing measurement for all.

In the above mentioned Lyon et al patent drop generation is accomplished by a traveling wave technique. This method is limited in both maximum printing width and printing quality. As taught by Lyon et al. a series of traveling waves propagate along the length of the orifice plate, stimulating the jets as they go. However, wave propagation is accompanied by energy attenuation. This causes a steady lengthening of the jet filament along the array. Eventually the filament length variation becomes excessive and the maximum usable printing width is reached. The reason the traveling wave method is also limited in printing quality is because in this system the different jets do not generate drops simultaneously, but there is a known phase relation between them.

Thus the system can in theory operate at better resolution, but each data channel must be provided with a phase shifting network for phase shifting the switching control signals by an amount matching the known jet-to-jet drop generation phase shift. This requires a great deal of electronics and is difficult to achieve in practice due to unpredictable variation of plate wavelength (and hence phase errors) caused by nonuniform orifice plate boundries. Even if such synchronization is achieved, the best printing quality is still not available due to the fact that a square droplet matrix can not be formed by traveling waves. Thus such systems have in the past been operated at one-fourth to one-fifth the maximum theoretical resolution; that is, the data frequency and the drop stimulation frequency are so adjusted that three to five drops are generated during one data period. As a result a single resolution cell on the web comprises three to five drops, but it is not necessary to observe any particular phase relation between drop stimulation and drop charging.

An alternative drop stimulation method, which is said to generate uniform filaments and drops simultaneously in a row of jets, is disclosed in Titus et al. U.S. Pat. No. 3,900,162. This patent generally discloses the use of an orifice plate disposed on the bottom of an ink reservoir with the pressure fluctuations in the ink issuing from the orifices being induced by a flexible pressure plate disposed remote from the surface of the orifice plate, but within the ink reservoir.

A plurality of flexible piezoelectric transducers are bonded to the surface of the pressure plate so that when they are simultaneously activated they will produce generally uniform transverse bending along the entire length of the plate so as to produce a uniform pressure distribution in the fluid above the orifices and thus uniformity in the filament and droplet size issuing from the orifices. However, such device requires substantial numbers of the piezoelectric transducers to be bonded along the length of the pressure plate. This results in several practical difficulties due to bonding problems and the cost associated with the relatively high number of transducers required to create uniform stimulation along a long pressure plate.

A further disadvantage associated with such prior art devices is that a slit is built into each end of the plate and the pressure plate is contained within the reservoir itself so that the fluid lies on both sides of the plate. This arrangement does have the advantage of equalizing the pressure on both sides of the pressure plate so that it will bend uniformly in both directions as it vibrates and flexes back and forth. However, it has the unfortunate disadvantage of also producing secondary waves in the fluid passing through the orifices since the fluid on both sides of the pressure plate is in communication and as the pressure plate moves outwardly from the orifices it produces a maximum pressure in the fluid on the side of the pressure plate opposite the orifices which is transmitted through the liquid back to the orifice side. This causes undesirable disturbances in the filaments thus reducing uniformity in filament and droplet size as well as reducing efficiency of energy transmission from the pressure plate to the orifices.

Moreover, the pair of slits can cause two problems. In the first place they can generate reflections of the bending motion and thus cause energy non-uniformity along the plate. Secondly, the fact that they can relieve the pressure in the fluid makes the perturbation by the plate on the fluid ineffective.

SUMMARY OF THE INVENTION

The present invention overcomes the above described difficulties and disadvantages associated with the prior art devices by producing relatively uniform filament and droplet size through the use of a pressure plate remote from a rigid, nonvibrating orifice plate, the pressure plate being stimulated by a plurality of stimulating devices with only one side of the pressure plate in contact with the fluid and the opposite side being acted upon by the stimulating devices.

A rigid orifice plate forms the bottom of a reservoir which contains the fluid under pressure. The flexible pressure plate forms the upper portion of the reservoir opposite the orifice plate so that the fluid is contained between the orifice plate and pressure plate within the fluid reservoir. Externally of the reservoir and acting upon the outer surface of the pressure plate are a plurality of stimulator means, preferably in the form of electro-acoustical transducers which act upon the pressure plate causing flexural bending transverse to the longitudinal axis of symmetry of the pressure plate. The stimulators are not bonded to the surface of the pressure plate, but merely contact the surface of the plate along its effective length. The stimulators are simultaneously repetitively activated by electrical impulses from conventional signal generating apparatus.

The stimulators are aligned along the upper surface of the pressure plate, so that they are disposed symetrically about the central longitudinal axis of the pressure plate, over the orifices and forming essentially line contact with the upper surface of the pressure plate. The stimulators are preferably disposed with their longitudinal axes in the same plane as the longitudinal axis of the pressure plate and evenly spaced along the surface of the plate. Alternatively, the stimulators may have only point contact with the pressure plate in which case they should be aligned in a plane containing the longitudinal axis of the pressure plate so that the force is uniformly transmitted along the length of the plate.

The stimulators which are electro-acoustic transducer assemblies are preferably piezoelectric transducers or their equivalent sandwiched between a backing member and a force transmitting member. The lower portion of the force transmitting member can be shaped to produce point, line, or other desired shape of contact area, although line contact along the longitudinal axes of the pressure plate is preferred since this appears to produce more uniform flexure of the pressure plate.

The transducers and the immediately adjacent sandwiching portions of the upper and lower members described above preferably have both a length and width substantially less than one-half the wavelength of flexural waves in the stimulator at the operating frequency. This is important particularly in the lengthwise dimensions parallel to the longitudinal axis of the pressure plate, since a dimension greater than this allows interferring reflected wave motion within the stimulator which results in undesirable "noise", i.e. interferring wave motion in the system.

Likewise, the spacing between adjacent stimulator surfaces in contact with the upper surface of the pressure plate is important. The distance between such adjacent contacting surfaces of the force transmitting members should be substantially less than one-half of the wavelength of flexural waves in the pressure plate at the operating frequency. This, again, reduces the "noise" that otherwise is present within regions of the pressure plate between adjacent stimulators due to interferring reflected wave motion or overlapping of wave motion generated by adjacent or remote force transmitting elements.

It is also preferable to have acoustical damping devices associated with the pressure plate in order to reduce or substantially eliminate interferring standing waves from developing along the pressure plate. This can be accomplished, for example, by securing acoustical damping material to each end of the pressure plate either inside or outside of the fluid containing reservoir.

It can thus be seen that the disadvantage associated with the prior art as to having fluid on both sides of the pressure plate in communication, is overcome by the present invention. This is accomplished by having the transducers disposed externally of the reservoir and with fluid on only one side of the pressure plate. In other words, the transducers of the present invention produce the necessary positive force by causing downward bending of the pressure plate, but do not produce the undesirable secondary positive pressure as the pressure plate is bending upwardly, as it would if fluid were on both sides of the pressure plate and in communication.

Also, the fact that the transducers are not bonded directly to the surface of the pressure plate overcomes most of the disadvantages referred to in connection with bonding a plurality of such transducers to the plate. Namely, a more uniform and more easily controlled contact between the surface of the pressure plate and the force supplying surface of the force transmitting member can be maintained than is the case when a bonding material is used.

In addition, two of the major advantages of the non-permanent bond which are otherwise not possible is the ability to optimize stimulation quality and the ability to replace defective transducers.

BRIEF DESCRIPTION OF THE DRAWINGS

FIG. 1 is an expanded pictorial view of the preferred embodiment of a portion of the recording head assembly of an ink jet printing device;

FIG. 2 is a cross sectional view through the embodiment illustrated in FIG. 1 in an unexpanded position;

FIG. 3 is an enlarged pictorial view of the stimulator means of the embodiment illustrated in FIG. 1;

FIG. 4 is a schematic side view of the pressure plate and stimulator means of the preferred embodiment of the present invention;

FIG. 5 is a diagrammatic view illustrating the preferred pattern of contact between the stimulator means and the pressure plate.

DETAILED DESCRIPTION OF THE PREFERRED EMBODIMENT

The present invention is intended to be utilized as part of an ink jet printing device such as those disclosed in the Sweet et. al. U.S. Pat. No. 3,373,437 and Taylor et al. U.S. Pat. No. 3,560,641. Therefore, those portions of the ink jet printing devices which do not specifically relate to the present invention are not disclosed in detail herein and reference should be made to the above patents for such detail.

Referring now to the apparatus as illustrated in FIG. 1, it basically comprises a manifold 10 forming a fluid supply reservoir, an orifice plate 12, a pressure plate 14, and a plurality of stimulator members 16 controlled by an electrical signal generator 18. The manifold 10 is a relatively rigid rectangular block of metal having a fluid reservoir 19 in the form of a central oblong opening with internal tapered walls 20 and 22, as shown in FIG. 2, which taper from the pressure plate 14 downwardly and inwardly towards the orifice plate 12.

A fluid supply tube 24 extends through the side of manifold 10 into the reservoir 19 in order to maintain a supply of fluid in the reservoir. Fluid is supplied to the reservoir 19 at a predetermined pressure so that the fluid completely fills the reservoir and maintains the fluid in the reservoir under pressure.

The orifice plate 12 is secured to the lower surface of the manifold 10 such as by adhesive bonding or clamping the ends and sides of the orifice plate against the bottom of the manifold so that it is relatively rigidly supported. The orifice plate 10 is preferably thick enough as to be rigid and not vibrate due to pressure fluctuations within the fluid. A series of orifices 26 of the desired diameter are formed in the orifice plate in two rows of evenly spaced orifices. The orifice plate 12 is clamped or adhesively secured to the manifold 10 in such a manner that the orifices 26 are substantially centered in the bottom of the reservoir 19, as shown in FIG. 2.

Secured to the upper surface of the manifold 10 is the pressure plate 14. Pressure plate 14 is relatively flexible; sufficiently so that it will bend transverse to its longitudinal axis when acted upon by the stimulator members 16. It is secured to the upper surface of the manifold 10 in such a manner that it is rigidly clamped or soldered around the hole defined by the upper opening of fluid reservoir 19 so that only that portion of the pressure plate which extends over the opening will flex under action of the stimulator members 16.

Secured to the top surface of pressure plate 14 are a pair of damping members 28 and 30 made of a relatively resilient material such as polyurethane. The damping members 28 and 30 can be formed by placing an appropriately shaped mold on the top surface of pressure plate 14 in the unassembled condition and then pouring molten polyurethane into the mold and letting it cure.

The stimulator members 16, one of which is shown in detail in FIG. 3, preferably utilize piezoelectric transducers although other types of electro-acoustical transducers may be utilized. For example, magneto-strictive, electro-dynamic or electro-static transducers could be used.

Each stimulator 16 is composed of an upper backing plate 31, a pair of piezoelectric transducers 32 and 33 which are preferably thickness mode ceramic transducers, a stimulator mounting or attaching plate 34 which also functions as an electrode for transducers 32 and 33, resilient mounting members 35 which also acts as electric insulators, and a force transmitting member 36. Each stimulator member 16 is secured together by bolt 37 which also acts as an electrode for transducers 32 and 33 such that an electrical current can be passed through the transducers between mounting plate 34 and bolt 37.

The transducers 32 and 33, upper backing plate 31, and force transmitting member 36 are all substantially coextensive and in parallel vertical alignment as illustrated in FIG. 3. The plurality of upper backing plates 31 should preferably be of generally higher acoustical impedance material than the force transmitting member 36 in order to enhance force transmission to pressure plate 14. Mounting plate 34 is provided with a plurality of slots 38 through which the stimulator members 16 can be adjustably secured to the frame of the device in a desired position longitudinally over the pressure plate 14.

The force transmitting member 36 of each stimulator member 16 can be a variety of shapes, but is illustrated in the drawings in its preferred form as having flat parallel end walls 40 and tapered side wall portions 42 which converge to form essentially a line contact with the upper surface of pressure plate 14. It is to be noted, however, that the side walls 42 may slope to form a land on the bottom edge of force transmitting member 36 rather than a line, so that a rectangular area is available for surface contact with pressure plate 14. As a further alternative, it is also possible to slope the end walls 40 converging inwardly as well as having side walls 42 converging inwardly so as to form an inverted pyramid, in order to establish a point contact with pressure plate 14.

The resilient mounting members 35 can be of any desired material and need only be of minimal thickness, so long as some resiliency is provided which is sufficient to substantially prevent transfer of vibration from the mounting plate 34 through the securing frame structure 45 to the manifold 10 and also to act as a good insulator. The resiliency of members 35 is to prevent waves from traveling through the manifold and affecting drop propogation in the orifices.

Transducers 32 and 33 are activated through the central electrode, i.e. plate 34 and bolt 37 by the signal generator 18 so that a plurality of the stimulator member 16 can be activated simultaneously and repetitively in a well known manner.

As shown in FIG. 4, the transducers are equally spaced along the longitudinal axis of symmetry of the upper surface of the pressure plate 14 and are separated by a distance D between the stimulator members 16. As a practical matter, the distance D is fairly important in that it is preferable that it be substantially less than one-half the wavelength of flexural waves in the pressure plate at the operating frequency. This is important in order to reduce as much as possible the potential for interferring standing waves between adjacent or more remote stimulator members 16.

The same is true for the width W of each of the stimulator members 16 in that the width W should be substantially less than one-half the wavelength of flexural waves in the stimulator member 16 at the operating frequency. This reduces the possibility of reflected wave interference or distortion within the stimulator member which would otherwise occur. Although the crosswise dimension of the stimulator members 16 i.e. widthwise of the pressure plate 14, is not as critical as the width W it should also preferable be less than one-half the wavelength of flexural waves within the stimulator member at the operating frequency.

It is to be noted that as a practical matter, the distance D and width W may be substantially closer to half the wavelength of the respective flexural waves without causing substantial energy non-uniformity which would effect the uniformity of the length of filaments. However, as a substantial guide line the dimensions of one-half the wavelength of the flexural waves traveling through the body concerned is acceptable.

FIG. 5 illustrates the preferred loci of contact 60 between the stimulator members 16 and the top of the pressure plate 14. Line contact along the longitudinal axis of the pressure plate is preferred. However, as mentioned above, point contact or rectangular surface area contact, for example, may be utilized for particular embodiments if it is desired.

In the case of wide band stimulators the distance from the bottom surface of pressure plate 14 to the upper surface of orifice plate 12 within the fluid reservoir 19 is not critical from a stimulation point of view and can be as small as fluid dynamics allow. For narrow band stimulation it should be a multiple of an odd quarter wave length of the fluid compression wave at the operating frequency. This substantially assures that the orifice plate is at the nodal plane where the vibration amplitude substantially vanishes.

The orifice plate 12 is of relatively rigid construction in that, unlike the traveling wave stimulated orifice plate in which the orifice plate is vibrated, the present orifice plate is intended to remain rigid. Orifice plate 12 is secured by adhesion, soldering or bolting with a supporting frame (not shown), against the lower surface of manifold 10 so as to maintain the orifice plate 12 substantially rigid with orifices 26 aligned along the length of the orifice plate symmetrically below the longitudinal line of contact surfaces between stimulator members 16 and pressure plate 14. In order to assist in maintaining the orifice plate 12 rigid in the area of the reservoir, the inside walls of the manifold where they intersect the upper surface of the orifice plate are preferably less than one-half the wave length of flexural waves in the orifice plate at the maximum operating frequency; again to minimize propogation of interferring waves within the orifice plate.

In operation, stimulator members 16 are all excited at the desired frequency to produce a uniform series of drops from the plurality of orifice 26. Each stimulator member is excited by electrical impulses supplied to both transducers 32 and 33. Transducers 32 and 33 apply equal forces against mounting plate 34 which causes backing member 31 and force transmitting member 36 to be displaced in opposite directions.

Under operating condition, the plate 34 is substantially positioned at a nodal point between transducers 32 and 33 where minimal excitation of the mounting plate will occur. This further substantially reduces the transfer of interferring wave motion from the mounting plate to the frame 45 which would in turn otherwise pass interferring waves to manifold 10.

As the stimulator members 16 are simultaneously excited periodically they force transmitting members 36 to flex pressure plate 14 up and down to the dotted line positions as illustrated in FIG. 2. Thus, since the lower surface of pressure plate 14 is in contact with the upper surface of the liquid in the reservoir, it causes pressure waves to be propogated through the liquid in the reservoir which is transferred to the liquid being expelled from the orifices, to produce the desired uniformity in filaments and drops.

It is important to simultaneously and with equal amplitude excite all of the stimulator members along the length of the pressure plate. To achieve this, the preferred method of stimulator array excitation is to operate off resonance even though on resonance excitation is more efficient and achievable. The reason for this is that in practice the resonant frequency of transducers is likely to be slightly different due to variation of various physical perameters of a composite transducer.

However, both the tranducer's amplitude and phase depends on frequency. When transducers having similar, but not exactly the same resonant frequency, are simultaneously driven at a given frequency, for example, the resonant frequency of one of the transducers, the other transducers in the array will be supplying different amplitudes at different times than the transducers driven at resonance. The magnitude of the differences depends on the width of the resonance band; the narrower the band the larger the difference in magnitude.

However, amplitude and phase become relatively independent of frequency when a transducer is operated off resonance, hence a much more uniform phase distribution along the surface of the pressure plate 14 can be obtained by driving the transducers at a level above or below their resonant frequencies. At these frequencies there is greater uniformity in the amplitude and phase supplied and although the energy losses are fairly large due to driving the transducers off the resonant frequency, this can be compensated for by supplying more energy. However, the advantage obtained in uniform and syncronous application of force is well worth such increased energy consumption.

By having contact between the bottom edge of the bottom members 36 and the upper surface of pressure plate 14 rather than having the transducers bonded permanently thereto with an adhesive or the like, which is the case with some prior art devices, certain advantages are obtained. Because of the lack of uniformity in producing layers of adhesive to bond a plurality of transducers to the pressure plate, the present invention provides a more uniform energy distribution since only the uniformity of the contacting surfaces is involved. Also, over extended periods of use, either a bond or a transducer may fail. When the transducer is adhesively bonded to the pressure plate, it makes it extremely difficult and expensive if not impossible to replace the transducer. Further, the ability to move the transducers of the present invention relative to each other along the longitudinal dimension of the pressure plate as well as the ability to adjust the coupling pressure, permits optimization of this relative positioning depending upon operating frequency. This adjustment is not possible with the prior art bonded transducers.

Although the foregoing illustrates the preferred embodiment of the present invention, other variations are possible. All such variations as would be obvious to one skilled in this art are intended to be included within the scope of the invention as defined by the following claims.

What is claimed is:

1. Apparatus for producing a plurality of streams of fluid droplets, comprising:
   reservoir means for containing a fluid under pressure;
   orifice plate means forming a bottom portion of said reservoir means and having a plurality of orifices defined therein through which said fluid can be expelled from said reservoir means;
   elongated pressure plate means forming a top portion of said reservoir means opposite said bottom portion;
   a plurality of pressure plate stimulator means contacting a surface of said pressure plate means opposite another surface thereof which is in contact with said fluid in said reservoir, for bending said pressure plate means transverse to the longitudinal dimension of said pressure plate means so as to cause a uniform pressure disturbance in said fluid issuing from said plurality of orifices;
   support means for supporting said plurality of stimulator means independently of and above said pressure plate means; and
   means for simultaneously repetitively activating said stimulator means to cause a series of said disturbances.

2. Apparatus as defined in claim 1 wherein each said stimulator means includes:
   a pair of piezoelectric transducers, one disposed on each side of said support means and in engagement with opposite surfaces thereof;
   a backing member mounted on one of said transducers on the opposite side thereof of said support means from said pressure plate means;
   a force transmitting member engaging the other of said transducers on the opposite side thereof of said support means, and contacting the upper surface portion of said pressure plate means.

3. Apparatus as defined in claim 2 wherein the dimensions of said transducers, said backing member and said force transmitting member, along the longitudinal dimension of said pressure plate means are less than one-half of the flexural wavelength of said stimulator means at the maximum operating frequency.

4. Apparatus as defined in claim 3 wherein said support means includes:
   a mounting plate disposed between said transducers in engagement therewith and forming an electrode therefore;
   resilient electrically insulating mounting members disposed between said mounting plate and said reservoir means so as to vibrationally isolate said stimulator means from said reservoir means.

5. Apparatus as defined in claim 3 wherein said plurality of pressure plate stimulator means are disposed along said surface of said pressure plate means, each being symmetrical about the longitudinal axis of said pressure plate means and spaced less than about one-half the wavelength of the natural frequency of vibration of said pressure plate means between adjacent contacting portions of said stimulator means with said pressure plate means.

6. Apparatus as defined in claim 5 wherein the longitudinal axes of the contacting surfaces of said stimulator means with said pressure plate means lie in the plane containing the longitudinal axis of and normal to said surface of said pressure plate means.

7. Apparatus as defined in claim 5 wherein damping means are provided at each end portion of said pressure plate means to substantially reduce reflected vibration from said end portions.

8. Apparatus as defined in claim 7 wherein said damping means comprises a resilient member engaging either of said surfaces of said pressure plate means.

* * * * *

UNITED STATES PATENT AND TRADEMARK OFFICE
CERTIFICATE OF CORRECTION

PATENT NO. : 4,095,232
DATED : June 13, 1978
INVENTOR(S) : Charles L. Cha

It is certified that error appears in the above-identified patent and that said Letters Patent are hereby corrected as shown below:

In the references, "Fray" should be --Frey--.

Column 1, line 58, "stream" should be --streams--.

Column 6, line 3, after "stimulator" insert --member--.

Signed and Sealed this

Twelfth Day of December 1978

[SEAL]

Attest:

RUTH C. MASON
Attesting Officer

DONALD W. BANNER
Commissioner of Patents and Trademarks